United States Patent
Burke et al.

[15] 3,666,739
[45] May 30, 1972

[54] PREPARATION OF UNSATURATED COMPOUNDS BY XANTHATE DECOMPOSITION

[72] Inventors: Noel I. Burke, Danville; Douglas J. Bridgeford, Champaign; Albin F. Turbak, Danville, all of Ill.

[73] Assignee: Tee-Pak, Inc., Chicago, Ill.

[22] Filed: Sept. 10, 1969

[21] Appl. No.: 856,813

[52] U.S. Cl. .................260/91.3 VA, 260/88.1 R, 260/94.1, 260/216, 260/233.5, 260/397.2, 260/682
[51] Int. Cl. ..................C08f 3/34, C08f 23/00, C08f 27/00
[58] Field of Search..................260/88.1, 91.3 PV, 91.3 VA, 260/94.1, 212, 218, 233.5, 682, 397.2, 88.1 R, 216

[56] References Cited

UNITED STATES PATENTS

| | | | |
|---|---|---|---|
| 2,041,907 | 5/1936 | Dosne........................................18/54 |
| 2,852,333 | 9/1958 | Cox et al....................................18/54 |
| 2,751,628 | 6/1956 | Carpenter et al..........................18/55 |
| 2,838,469 | 6/1958 | Buselli et al. ..........................260/45.5 |

Primary Examiner—Joseph L. Schofer
Assistant Examiner—Stanford M. Levin
Attorney—Neal J. Mosely and David V. Munnis

[57] ABSTRACT

Simple and complex unsaturated compounds are prepared by decomposition of certain xanthate esters, Xanthate esters of the form:

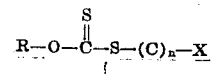

where R is an alkyl function having at least one H in a position alpha to the R—O bond, $(C)_n$ is a linear alkyl function either substituted or unsubstituted, with $n = 1 - 3$, X has a basicity greater than the $\diagdown$C=S function and comprises a C or S containing functional group having at least one double or triple bond to a hetero atom, the functional group being connected to $(C)_n$ through C or S; will decompose upon heating in water or in a protonated nonaqueous solvent, e.g. methanol, ethanol, etc., glycol, cellosolve, liquid ammonia, pyridine, lower alkyl amines, aniline, etc., to yield an unsaturated derivative of R.

9 Claims, No Drawings

PREPARATION OF UNSATURATED COMPOUNDS BY XANTHATE DECOMPOSITION

BACKGROUND OF THE INVENTION

1. FIELD OF THE INVENTION

This invention relates to an improved process for the preparation of unsaturated compounds from alcohols by thermal decomposition of certain xanthate ester intermediates.

2. DESCRIPTION OF THE PRIOR ART

The production of unsaturated compounds from alcohols has been known for a long time. However, most of the methods of dehydration involve the treatment of the alcohol with a strong acid or the thermal decomposition of the alcohol or one of its derivatives. Some of the better known and most often used methods of dehydration are the use of an acid such as sulfuric acid, phosphorus pentoxide, phosphorus oxychloride, and other strong acids; the pyrolysis of the alcohol on alumina, the pyrolysis of an ester of the alcohol, usually the acetate or benzoate, and the pyrolysis of a xanthate ester of the alcohol. Not all compounds will survive the treatment of a strong acid and-or pyrolysis. Polymeric alcohols as a class will usually decompose to a black, often tarry mass if a strong acid or thermal decomposition technique is used in an attempt to produce an unsaturated compound from the alcohol.

The Chugaev reaction prepares certain unsaturated compounds by pyrolysis of alkyl xanthate esters. This reaction is run anhydrous at a high temperature and is applicable only to the production of a limited number of unsaturated compounds.

Recently, Rogovin has produced an unsaturated cellulose by making the tosylate, displacing the tosylate with iodide, and finally dehydrohalogenating the iodide derivative. Unlike previous attempts to dehydrate cellulose by pyrolitic means, the Rogovin procedure gave a white unsaturated cellulose with a double bond in the $C_5 - C_6$ position. While the Rogovin procedure gives a pure product, the cost of the reagents involved makes the economic practicality of the procedure quite doubtful.

SUMMARY OF THE INVENTION

This invention was based upon the discovery that simple and complex, monomeric and polymeric, unsaturated compounds may be prepared by decomposition of certain xanthate esters.

Xanthate esters of the form:

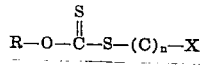

where R is an alkyl function having at least one H in a position alpha to the R — O bond, $(C)_n$ is a linear alkyl function either substituted or unsubstituted, with $n = 1 - 3$, X has a basicity greater than the

function and comprises a C or S containing functional group having at least one double or triple bond to a hetero atom, the functional group being connected to $(C)_n$ through C or S; will decompose upon heating in water or in a protonated nonaqueous solvent, e.g. methanol, ethanol, etc., glycol, cellosolve, liquid ammonia, pyridine, lower alkyl amines, aniline, etc., to yield an unsaturated derivative of R. The term "alkyl function" as used above refers to a functional group which is alkyl in structure which may be complete in itself or may be substituted or may be a part of a larger molecule or functional group. The alkyl function R may be a simple or complex, substituted or unsubstituted, monomeric or polymeric, function but must have at least one H in a position alpha to the R — O bond. $(C)_n$ is an alkyl function of the form, $- CR_2^1 -$, $- CR_2^1CR_2^2 -$, or $- CR_2^1CR_2^2CR_2^3 -$ where $R^1$, $R^2$, and $R^3$ may be hydrogen or inert substituents.

The decomposition of xanthate esters in accordance with this invention is preferably carried out in water or in a protonated non-aqueous solvent, preferably acidified to a hydrogen activity, (defined as — log of effective hydrogen ion concentration) of about 3 –6. When the xanthate decomposition is carried out in water it is preferred to heat a solution or slurry of the xanthate in water at a pH in the range of about 4 –5.

This invention arose as a result of work done on certain cellulose xanthate derivatives and an effort to establish a mechanism for the decomposition of xanthates. The work which we have carried out appears to support the mechanism which we have proposed and which is described herein for a better understanding of the invention. The proposed mechanism however merely represents our best current theory of the mechanism of the reaction and should not be considered to be a completely accurate description of the way that the reaction takes place.

During the course of some work on cellulose xanthate derivatives, we attempted to determine the reason that cellulose xanthate S-propane sulfonate, which is water soluble, would not wash off fabrics that had a 2 – 4 percent addon of the polymer. This investigation showed that at least part of the sulfur in the derivative was being lost upon heating, both on the fabric and in solution. Since cellulose xanthate derivatives are extremely complex we decided that at least the early part of the investigation should be done on simple model compounds.

The isopropyl xanthate S-propane sulfonate derivative was prepared, then dissolved in water at pH 4.5 and the solution heated at 100° C. The gases evolved were examined using gas chromatography. The gases that were expected from hydrolysis, viz. carbon disulfide, carbonyl sulfide, carbon dioxide, hydrogen sulfide, and in some cases sulfur dioxide, were found as well as an unidentified gas. Due to the long retention time of this gas it was thought to be an organic material. A sample of the gas was collected and identified by infrared spectroscopy as propylene. The presence of propylene in the evolved gases was totally unexpected in view of previous conceptions of the mechanism of the xanthate decomposition.

In order to be sure of the presence and the approximate amount of propylene, the decomposition was repeated, but the evolved gases were separated and the hydrocarbon passed into bromine in carbon tetrachloride. The excess bromine was back titrated and the organic portion was removed and the carbon tetrachloride evaporated to leave an oil. The infrared spectrum of this material was identical with the infrared spectra of an authentic sample of dibromopropane. It was thought at first that the reaction might be similar to the well known Chugaev reaction which utilizes alkyl esters of xanthates in pyrolysis. However, the Chugaev reaction is run anhydrous at a high temperature. Nevertheless, S-methyl-2-propyl xanthate was prepared and decomposed in aqueous media at pH 4.5. This yielded only minute amounts of propylene.

Since the decomposition did not seem to be a modification of the Chugaev reaction and since there is no precedent for this reaction in the literature, a variety of xanthate derivatives were prepared in an attempt to determine the utility and scope of the reaction.

The electron withdrawing power of the attached group was considered necessary for the decomposition reaction. Therefore, the carboxy methyl group was prepared and decomposed over a range of pH. The pH range of 4 –5 seems to give the best result. At pH 4.5 the reaction is relatively slow for many derivatives but gave good yields if carried out for a long enough time.

In the investigation, various derivatives were prepared of xanthates of n-propanol, 2-propanol, 2-butanol, cyclohexanol and cholesterol. The derivatives used included esters of the alcohol xanthates prepared from derivatives of 2-propanone, acetaldehyde dialkyl acetal, cyanoethyl and cyanomethyl. The decomposition of each of these derivatives seems to be a critical function of the pH of the media if a reasonable yield is to be obtained. It seemed possible that the pH dependence of the reaction was due to competing reactions. The primarily competing reaction that would reduce the yield is hydrolysis. At low pH, the hydrolysis of xanthate esters is acid-catalyzed and at high pH of the hydrolysis is base catalyzed. If the rate dependent step of the decomposition to produce an unsaturated compound is a steric one, that is, the molecule must be in a particular configuration, then the pH dependence is one of reduction of by-products and does not directly affect the rate of decomposition. Since the time of these reactions is generally quite long, it is reasonable that hydrolysis must be repressed if the decomposition to an unsaturated product is to take place.

With the pH dependence in mind and the apparent necessity for the presence of an electron withdrawing group, the following mechanism is proposed:

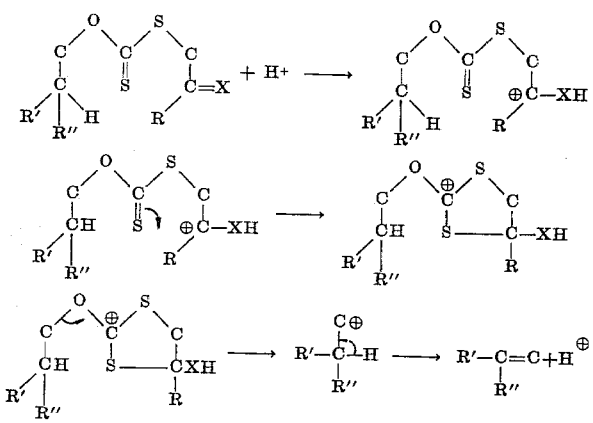

In the above mechanism, the compound is shown in skeletal form. The unsatisfied valences on the carbon atoms are considered to be connected to hydrogen, hydrocarbon radicals, or any inert substituent or functional group.

The postulated mechanism would also be applicable to the formation of a six membered ring as the transitory "intermediate." This mechanism indicates that it is not the electron withdrawing power of the attached group, but the ability of the group to produce a carbonium ion on the carbon atom containing the group. Thus, a nitroethane ester would not be expected to give any unsaturated product. When the nitroethane derivative of isopropyl xanthate was treated for 150 hours no propylene was obtained.

The proposed mechanism also indicates that any atom in the intermediate that is able to support a positive charge would probably not undergo the decomposition. The types of derivatives that the mechanism predicts that would not undergo the decomposition are the dithiocarbamates and amide derivatives among others.

When dithiocarbamate esters were treated they all failed to give the corresponding unsaturated compounds. Likewise, amide derivatives of xanthates failed to undergo the decomposition, as predicted.

In the case of the amides, the protonated carbonyl would be the most stable form of the ion and in the case of dithiocarbamates the charge would be relatively stable on the nitrogen; however, this intermediate could easily add water to give the amine that was used to prepare the dithiocarbamate.

The proposed mechanism would indicate that any molecule that can obtain the required steric configuration and conforms to the formula given above (in the abstract of the disclosure) will yield the corresponding unsaturated compound on decomposition. The sulfonate group does not fit the same mechanism as the other formulae; however, this group was the only one that gave sulfur dioxide in the gas chromatographic analysis of evolved gases. A mechanism for decomposition of the sulfonate derivative involves the formation of a six membered hetero cycle containing sulfur, as an intermediate, with an accompanying splitting off of sulfurous acid, which decomposes to yield sulfur dioxide. The heterocyclic intermediate decomposes to yield the desired unsaturated compound.

DESCRIPTION OF THE PREFERRED EMBODIMENTS

In the following examples there are illustrated a variety of starting materials and reaction conditions which illustrate the general operability of our invention as described broadly above. The examples illustrate the general preparation of olefins by thermal decomposition of certain xanthate esters in aqueous media or in other protonated solvents, preferably at a hydrogen activity in the range of about 3 –6.

EXAMPLES 1 - 17

A series of experiments were carried out in which various xanthate derivatives were decomposed under the conditions of this invention to produce unsaturated compounds. In each of the examples, 10 m moles of the xanthate derivative were dissolved in 15 ml. of water and the pH adjusted to the desired value with acid or alkali. The solutions were then heated under reflux for the indicated time. The reaction can be carried out at lower temperatures but longer reaction times are required. Nitrogen was used as a carrier gas at 30 cc/min. to remove gaseous products. The nitrogen effluent was passed through a solution of copper acetate to remove any hydrogen sulfide that might be evolved and then through a 0.5N NaOH to remove carbon dioxide and any gas that might pass the copper trap. Finally the nitrogen was passed into carbon tetrachloride, usually containing bromine, at −30° C. Most of the yields were calculated by backtitration of the bromine that had been added. A blank was run to determine the loss of bromine from the trap (which was nil at the longest time used). All of the unsaturated products produced were isolated pure at least once and identified by gas chromatography and infrared spectroscopy.

In Table I below the results of Examples 1 – 17 are tabulated, indicating the reactant xanthate compound, pH of the decomposition system, reaction time, yield (in percent based on the reactant), and the unsaturated product produced.

TABLE I

| Example number | Xanthate reactant | pH | Time of reaction, hours | Yield, percent | Product |
|---|---|---|---|---|---|
| 1 | S-(3-propane sulfonate)-2-propyl xantate (sodium salt) | 5.0 | 24 | 36 | Propylene. |
| 2 | do | 1.5 | 50 | 8 | Do. |
| 3 | S-(3-propane sulfonate)-2-butyl xanthate (sodium salt) | 5.5 | 50 | 16 | Butylene. |
| 4 | do | 5.5 | 50 | 18 | Do. |
| 5 | S-methyl-2-propyl xanthate | 4.0 | 60 | 3 | Propylene.[1] |
| 6 | S-carboxymethyl-2-propyl xanthate (sodium salt) | 4.5 | 24 | 27 | Do. |
| 7 | do | 4.5 | 84 | 73 | Do. |
| 8 | do | 4.5 | 154 | 75 | Do. |
| 9 | do | 8.5 | 50 | 11 | Do. |
| 10 | do | 1.0 | 50 | 12 | Do. |
| 11 | S-carboxymethyl-1-propyl xanthate (sodium salt) | 4.5 | 24 | 22 | Do. |
| 12 | S-carboxymethyl-2-butyl xanthate | 4.5 | 50 | 48 | Butylene. |
| 13 | S-cyanoethyl cyclohexyl xanthate | 4.5 | 50 | 65 | Cyclohexene. |
| 14 | S-ethyl carboxymethylate cyclohexyl xanthate | 4.5 | 100 | 45 | Do. |
| 15 | S-(2-propanone cyclohexyl xanthate | 4.5 | 100 | 40 | Do. |
| 16 | S-cyanoethyl cholesterol xanthate | 4.3 | 96 | 59 | $\Delta^{3,5}$ cholestradiene. |
| 17 | S-(acetaldehyde dimethyl acetal) cholesterol xanthate | 4.3 | 48 | 33 | Do. |

[1] Chugaev control base pt. run.

The xanthate ester reactants used in the above examples are largely known compounds which may be made by known procedures. The preparation of the xanthate esters used above was by mixture of the xanthate sodium salt and the reactant used for forming the derivative in solution or in a slurry, usually in the same alcohol from which the xanthate was derived. The xanthate salt and derivative were added in equal molar portions to the solvent and the reaction generally was highly exothermic and went to completion in a very short time. The reactants and the solvent used in preparing the xanthate esters for the various examples in the table are as follows:

Example 1-2—Sodium 2-propyl xanthate+propane sultone in isopropanol
Example 3-4—Sodium 2-butyl xanthate+propane sultone in 2-butanol
Example 5—Sodium 2-propyl xanthate+methyl chloride in isopropanol
Example 6-10—Sodium 2-propyl xanthate+sodium chloroacetate in isopropanol
Example 11—Sodium 1-propyl xanthante+sodium chloroacetate in n-propanol
Example 12—Sodium 2-butyl xanthante+sodium chloroacetate in 2-butanol
Example 13—Sodium cyclohexyl xanthate+acrylonitrile in cyclohexanol
Example 14—Sodium cyclohexyl xanthate+ethyl chloroacetate in cyclohexanol
Example 15—Sodium cylcohexyl xanthate+1-chloro-acetone in cyclohexanol
Example 16—Sodium cholesterol xanthate+acrylonitrile in dimethyl sulfoxide
Example 17—Sodium cholesterol xanthate+2-chloro 1,1 dimethoxy ethane in dimethylsulfoxide

DECOMPOSITION OF XANTHATES IN PROTONATED SOLVENTS

The following examples illustrate the decomposition of various xanthate esters in protonated non-aqueous solvents.

EXAMPLE 18

S-(3-propane sulfonate)-2 propyl xanthate is added to methanol and acidified to a hydrogen activity of 5. The solution is refluxed for about 24 hours with a substantial evolution of propylene.

EXAMPLE 19

S-(3-propane sulfonate)-2-butyl xanthate is dissolved in ethanol acidified to a hydrogen activity of 5.5. The solution is refluxed for a period of about 48 hours with a substantial evolution of butylene.

EXAMPLE 20

S-carboxymethyl-2-propyl xanthate is dissolved in ethylene glycol and acidified with HCl to a hydrogen activity of 4.5. The solution is heated to 100° C. for about 24 hours with a substantial evolution of propylene.

EXAMPLE 21

S-carboxymethyl-2-butyl xanthate is mixed with pyridine and acidified to a hydrogen activity of 4.5 by addition of pyridine hydrochloride. The mixture is heated to reflux and butylene is slowly evolved over a period of about 40 hours.

EXAMPLE 22

S-(2-propanone) cyclohexyl xanthate is mixed with cyclohexanol and acidified to a hydrogen activity of 4 with HC1. The mixture is heated at reflux for a period of about 90 hours with a substantial formation of cyclohexene.

DECOMPOSITION OF POLYMERIC ALCOHOL XANTHATE ESTERS

Various polymeric alcohol xanthate esters were prepared from polymeric alcohols such as cellulose, starch, amylose, and polyvinyl alcohol. The sodium xanthate salts were prepared by conventional xanthation methods. The sodium xanthate salts were dissolved in water and reacted in equal molar proportions (with respect to the xanthate group) with various reactants to produce the desired ester derivatives for subsequent decomposition. The reactions in each case were exothermic and went to substantial completion in a very short time.

Polymeric alcohol derivatives, prepared as described above, were slurried or dissolved in water at a concentration of 5 – 10 percent. The slurry was adjusted in pH to the desired value by addition of acid or base and refluxed for an extended period of time. The polymers were then filtered, washed in water, methanol and either acetone or methylene chloride and dried under vacuum (28 in. Hg.) at room temperature. The polymers were then slurried in methylene chloride or carbon tetrachloride and an excess of bromine was added and the slurries stirred overnight. The polymers were then filtered, washed with methanol, water, and acetone to remove excess bromine and chlorinated solvents, then dried at room temperature in a vacuum oven (28 in. Hg.) to a constant weight. As a control, each of the polymers was regenerated from its xanthate by use of acid, washed to remove by-products and then treated in the same manner as the derivatives. In no case did the regenerated polymers show any bromine, indicating that the polymers do not have any unsaturation.

EXAMPLE 23

Sodium cellulose xanthate was reacted in aqueous suspension with sodium chloracetate to yield the carboxymethyl ester of cellulose xanthate. The carboxymethyl ester of cellulose xanthate was then slurried in water at a concentration of about 5 percent and the pH adjusted to 8.5. The slurry was heated at reflux for about 60 hours. After the polymer was worked up in accordance with the above-described procedure, it was found that there had been a yield of 39 percent unsaturated cellulose derivative. In the cellulose derivative the unsaturation is present both as the vinyl unsaturation, i.e. in the 6 position, and as ring unsaturation.

The same procedure was repeated except that the carboxymethyl ester of cellulose xanthate was decomposed by reflex in 4.5 pH aqueous slurry. After 72 hours reaction time there was obtained a 63 percent yield of unsaturated cellulose.

When the same procedure of repeated with the substitution of methanol or ethanol as the decomposition medium a similar result is obtained provided that the solvent or reaction medium is protonated by addition of sufficient HCl to produce a hydrogen activity of about 4 – 5.

EXAMPLE 24

A 2-propanone derivative of cellulose xanthate was prepared by reacting equal molar quantities of sodium cellulose xanthate and chloracetone in water. The ester derivative was slurried in water at a concentration of about 10 percent and pH of 5.0. The slurry was heated to reflux for a period of 24 hours and the polymer worked up as described in the general procedure given above. There was a 42 percent yield of unsaturated cellulose having unsaturation both in the 6 position and in the anhydroglucose ring.

When this procedure is repeated and the ester decomposed in methanol or ethanol, similar results are obtained, provided that the solvent is protonated by addition of HCl in an amount sufficient to yield a hydrogen activity of about 4 – 5.

EXAMPLE 25

Sodium cellulose xanthate was reacted in aqueous solution or suspension with ethyl chloracetate to yield the ethyl carboxymethyl ester of cellulose xanthate. The xanthate ester was slurried in water at a 5 percent concentration and the pH adjusted to 4.4. The slurry was refluxed for 24 hours and the polymer worked up as described in the general procedure given above. There was a 27 percent yield of unsaturated cellulose.

A similar result is obtained when the cellulose ester is decomposed in ethanol, methanol, ethylene glycol, or cyclohexanol acidified to a hydrogen activity of about 4 – 5.

EXAMPLE 26

Sodium cellulose xanthate was reacted in aqueous solution with chlorocyanomethane to yield the cyanomethyl ester of cellulose xanthate.

The cellulose xanthate ester was slurried at a 5 percent concentration in water and the pH adjusted to 4.5. The slurry was refluxed for 24 hours and the polymer worked up as described in the general procedure given above. There was an 8.1 percent yield of unsaturated cellulose.

A similar result is obtained when the cellulose xanthate ester is decomposed by heating in a non-aqueous protonated solvent.

EXAMPLE 27

Sodium starch xanthate was reacted in aqueous solution with acrylonitrile to yield the cyanoethyl ester.

The cyanoethyl starch xanthate was slurried at a 5 percent concentration in water and pH adjusted to 4.5. The slurry was refluxed for 90 hours and the polymer worked up as described in the general procedure. There was a 29 percent yield of unsaturated starch, with the unsaturation being present both in the 6 position and in the anhydroglucose ring.

The decomposition of the starch xanthate ester in a protonated solvent yields an unsaturated starch as in the similar decomposition of the cellulose xanthate esters.

EXAMPLE 28

Starch xanthate was reacted in aqueous solution with sodium 3-chloropropanate to yield the carboxyethyl ester of starch xanthate.

The starch xanthate ester was then slurried at a 10 percent concentration in water and the pH adjusted to 4.5. The slurry was refluxed for 168 hours and the polymer worked up as described in the general procedure above. There was a 44 percent yield of unsaturated starch with the unsaturation being present both in the 6 and ring positions.

The thermal decomposition of the starch xanthate ester in other protonated solvents yields unsaturated starch as the product in good yield.

EXAMPLE 29

Sodium starch xanthate was reacted in aqueous solution with 2-chloro 1,1-dimethoxy ethane to yield the acetaldehyde dimethyl acetal ester of starch xanthate.

The starch xanthate ester was slurried in waster at pH 4.5 and a concentration of 5 percent. The slurry was refluxed for 90 hours and the polymer worked up as described generally above. There was a 58 percent yield of unsaturated starch in this process.

When the starch xanthate ester is decomposed in non-aqueous protonated solvents unsaturated starch is obtained in good yield.

EXAMPLE 30

Sodium amylose xanthate was reacted in aqueous solution with 2-chloro 1,1-di-ethoxy ethane to yield the acetaldehyde diethyl acetal ester of amylose xanthate.

The amylose xanthate ester was slurried in waster at 5 percent concentration at a pH of 4.5. The slurry was refluxed for 52 hours and the polymer worked up as described generally above.

There was a 41 percent yield of unsaturated amylose with the unsaturation present both in the 6 position and the ring. The decomposition of amylose xanthate ester in other protonated solvents gives similar good yields of unsaturated amylose.

EXAMPLE 31

Sodium polyvinyl alcohol xanthate was reacted with 2-chloro 1,1-diethoxy ethane in aqueous solution to yield the acetaldehyde diethyl acetal ester.

The polyvinyl alcohol xanthate ester was slurried at a 10 percent concentration in water and the pH adjusted to 4.5. The slurry was refluxed for 6 hours and the polymer worked up as described in the general procedure above.

There was a 26 percent yield of a vinyl alcohol-acetylene copolymer which is the theoretical derivative of a partial dehydration of polyvinyl alcohol. A similar yield of vinyl alcohol - acetylene copolymer is obtained when polyvinyl alcohol xanthate esters are decomposed in other protonated solvents at a suitable hydrogen activity.

The relative proportion of vinyl alcohol and acetylene in the copolymer produced in this example is dependent on a variety of factors. The use of a suitably high D. S. polyvinyl alcohol and carefully selected xanthation conditions to yield essentially 1.00 D.S. xanthate will yield an acetylene - vinyl alcohol copolymer which approaches nearly 100 percent polyacetylene in composition.

EXAMPLE 32

A vinyl alcohol - acetylene copolymer, produced as described in Example 31, is treated with aqueous alkali and $CS_2$ to yield the xanthate derivative. The sodium xanthate derivative of the vinyl alcohol - acetylene copolymer is then reacted in aqueous solution with 2-chloro 1,1-diethoxy ethane to yield the acetaldehyde diethyl acetal ester.

This xanthate ester of the vinyl alcohol - acetylene copolymer is slurried in water at pH 4.5 and a concentration of 10 percent. The solution is refluxed for 100 hours to yield a vinyl alcohol - acetylene copolymer having a substantially higher acetylene content. The product of this reaction is then re-xanthated and the ester derivative again formed and decomposed. After 3 or 4 successive xanthations and de-xanthations the product obtained is almost 100 percent polyacetylene. The product is essentially pure polyacetylene (pure with respect to the presence of copolymer) containing small amounts of reaction by-products. The properties of polyacetylene are dependent upon the D.P. of the polyvinyl alcohol from which it was derived and also the steric configuration of the polyvinyl alcohol. Thus, polyacetylene varies in physical properties from an oily liquid at low D.P. (and at higher D.P.'s in the case of highly branched structures) to a waxy solid at high D.P. (and especially in a linear configuration). The polymer has substantial electrical conductivity as compared to other organic compounds and absorbs substantial amounts of bromine readily. Polyacetylene is useful for a variety of purposes for which other polymers are used. It is useful as a coating material and as a structural plastic in the form of a sheet or film or molded article. The polymer may be brominated to yield a derivative which is highly flame resistant.

From the foregoing examples, we have demonstrated that a variety of simple and complex unsaturated compounds can be prepared by decomposition of certain xanthate esters. We have shown that xanthate esters of the form:

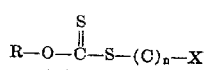

where R is an alkyl function having at least one H in a position alpha to the R — O bond, $(C)_n$ is a linear alkyl function either substituted or unsubstituted, with $n = 1 - 3$, X has a basicity greater than the

function and comprises a C or S containing functional group having at least one double or triple bond to a hetero atom, the functional group being connected to $(C)_n$ through C or S; will decompose upon heating in water or in a protonated non-aqueous solvent e.g. methanol, ethanol, etc., glycol, cellosolve, liquid ammonia, pyridine, lower alkyl amines, aniline, etc., to yield an unsaturated derivative of R.

In the xanthate esters which are decomposed in accordance with this invention the R group in the formula given is a simple or complex, substituted or unsubstituted, monomeric or polymeric, alkyl function having at least one H in a position alpha to the R - O bond. We have shown that the R group may be a simple alkyl group or may be a highly complex polymer and may contain substituents of any and all kinds so long as they are inert under the conditions of preparation and decomposition of the xanthate ester. The X group may be any of a variety of functional groups limited only in that it has a basicity greater than the thiocarbonyl function. Typical examples of the X group include the following:

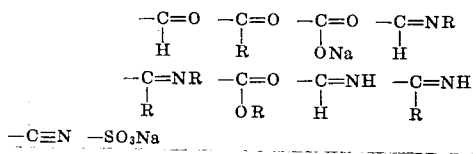

We claim:
1. A method of preparing unsaturated compounds which comprises heating a xanthate ester of the formula

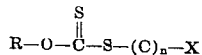

where R is an alkyl function having at least one H in a position alpha to the R - O bond, $(C)_n$ is a linear alkyl function either substituted or unsubstituted, with $n = 1 - 3$, X has a basicity greater than the

function and comprises a C or S containing functional group having at least one double or triple bond to a hetero atom, the functional group being connected to $(C)_n$ through C or S; in water at an acidic pH or a protonated non-aqueous solvent to yield an unsaturated derivative of R.

2. A method in accordance with claim 1 in which R is alkyl or cycloalkyl, either unsubstituted or containing inert substituents.

3. A method in accordance with claim 1 in which R is polymeric.

4. A method in accordance with claim 1 in which R is a constituent group in cellulose, starch, amylose, or polyvinyl alcohol.

5. A method in accordance with claim 1 in which the xanthate ester is decomposed by heating in water at an acidic pH or a protonated non-aqueous solvent at a hydrogen activity of about 3 - 6.

6. A method in accordance with claim 1 in which X is

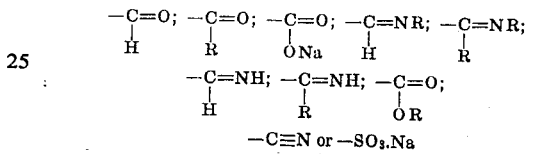

7. A method in accordance with claim 1 in which R is a constituent group in polyvinyl alcohol and the unsaturated product is polyacetylene or a copolymer of acetylene and vinyl alcohol.

8. A method in accordance with claim 1 in which R is a constituent group in a copolymer of vinyl alcohol and acetylene and the unsaturated product is polyacetylene or a copolymer of vinyl alcohol and acetylene having a higher polyacetylene content than the initial reactant.

9. Copolymers of vinyl alcohol and acetylene.

* * * * *